United States Patent [19]

Carter et al.

[11] Patent Number: 5,052,601

[45] Date of Patent: Oct. 1, 1991

[54] TRUCK-MOUNTED RACK FOR CARGO HOLDERS

[76] Inventors: Ralph E. Carter, Route 3, Box 30; John W. Jennings, 626 Airway Dr., both of Fulton, Mo. 65251

[21] Appl. No.: 470,319

[22] Filed: Jan. 25, 1990

[51] Int. Cl.⁵ .............................................. B60R 11/06
[52] U.S. Cl. .......................... 224/42.41; 224/42.45 R; 211/8; 211/60.001; 211/70.006
[58] Field of Search .......... 224/42.07, 42.38, 42.45 R, 224/42.41, 42.46 R; 211/8, 60.1, 4, 9, 64, 70.6

[56] References Cited

U.S. PATENT DOCUMENTS

| | | | |
|---|---|---|---|
| 1,221,584 | 4/1917 | Patrick | 211/8 |
| 1,342,517 | 6/1920 | Tyson | 211/8 |
| 2,097,939 | 11/1937 | Timm | 211/8 |
| 2,119,217 | 5/1938 | Rocchi | 211/70.6 X |
| 3,831,892 | 8/1974 | Herman | 224/42.45 R |
| 3,893,568 | 7/1975 | Lile | 224/42.45 R |
| 3,980,217 | 9/1976 | Yochum | 211/70.6 X |
| 4,057,183 | 11/1977 | Ness | 224/42.45 R |
| 4,248,399 | 2/1981 | Gipson | 224/42.45 R |
| 4,662,805 | 5/1987 | Tamez et al. | 211/4 X |
| 4,723,880 | 2/1988 | Stumpf, Jr. | 211/4 X |
| 4,878,605 | 11/1989 | Doyle et al. | 224/42.46 R X |

Primary Examiner—Henry J. Recla
Assistant Examiner—Robert M. Fetsuga
Attorney, Agent, or Firm—Gravely, Lieder & Woodruff

[57] ABSTRACT

A tractor-trailer combination carries cargo holders which extend across the cargo compartment of the trailer, bearing at their ends against the trailer side walls to thereby confine cargo when the compartment is less than fully filled. When not in use, the cargo holders are stored in a rack which may be attached to the back of the tractor cab or to the underside of the trailer bed. The rack includes a pair of spaced apart carrier bars having notches which receive the cargo holders and retaining arms which close the ends of the notches in the bars and retain the holders in those notches.

13 Claims, 2 Drawing Sheets

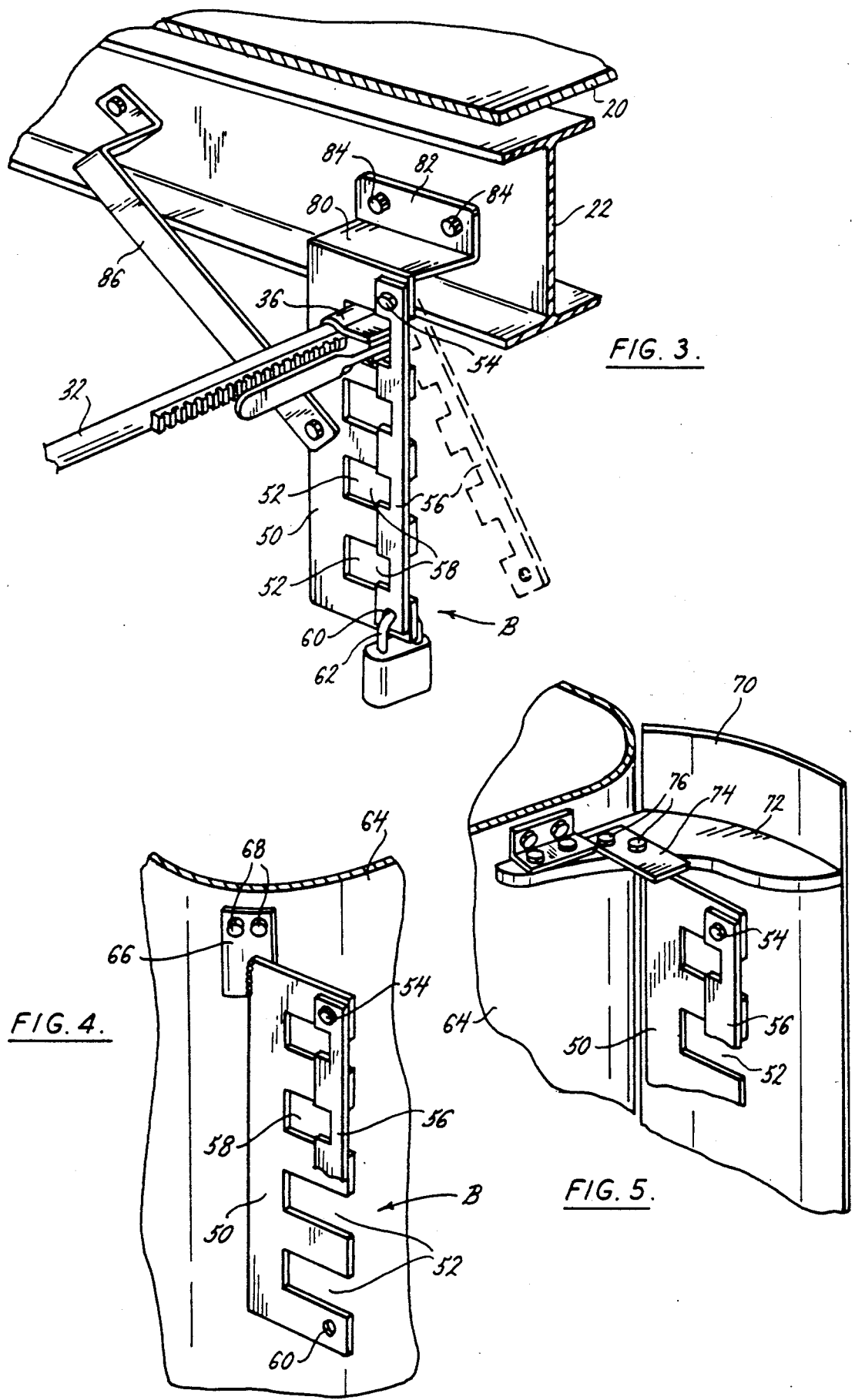

TRUCK-MOUNTED RACK FOR CARGO HOLDERS

BACKGROUND OF THE INVENTION

This invention relates in general to over-the-road trucks and more particularly to racks for securing cargo holders on such trucks.

Large over-the-road trucks usually consist of a tractor provided with a so-called fifth wheel, and a trailer, which is coupled to the tractor through the fifth wheel. Most trailers have flat beds, and many have totally enclosed interiors as well. Typically, these enclosed trailers carry cargo which is packaged in boxes. Sometimes not enough cargo exists to completely fill the cargo compartment of an enclosed trailer, and to prevent that cargo from shifting within the partially filled compartment, many operators place so-called cargo holders or stabilizers across the compartments, thereby effectively confining the cargo to a limited region of the compartment.

The typical cargo holder is for all intents and purposes a jack. It has two tubes, one fitted into the other in a telescopic arrangement, and a jacking mechanism to extend the tubes. This may be a ratchet device or a simple rack and pinion arrangement. Each tube at its free end has a pad covered with a high friction material, such as rubber. The operator installs the cargo holder by simply retracting its rods to the extent that the holder is shorter than the width of the cargo compartment. He then places the holder horizontally against the end of the cargo and expands it with the jacking mechanism. The friction pads bear against the walls of the trailer and retain the holder in position, that is extending transversely across the cargo compartment against the cargo. Sometimes a operator may install the holders vertically, expanding them so their pads bear against the bed and roof of the trailer.

Not all loads are so limited as to require cargo holders to stabilize them. Indeed, some completely fill the trailers into which they are placed. The cargo holders then become surplusage which must in some way be accommodated. Some operators simply place the unused cargo holders in the trailer along with the load, if sufficient space exists to accommodate them, and it usually does. But, often the cargo doors at the rear of the trailer are secured with a seal which precludes the operator from gaining access to the cargo compartment, and the presence of such a seal would preclude the operator from storing unused cargo holders in the trailer itself.

Other operators, who operate tractors having extenders projecting beyond the cabs of their tractors to improve the aerodynamic characteristics of their trucks, simply jack the unused cargo holders outwardly between the extenders so that the holder pads bear against the extenders. The holders are thus supported between the extenders much the same as they are supported between the side walls of a trailer when in use. However, the extenders are not as rigid as the trailer walls and may bend under the spreading force of the cargo holders. Moreover, the cargo holders are exposed and thus subject to theft.

The present invention resides in a rack for securing cargo holders on a truck where, when not in use, they will not interfere with the cargo carried by the truck and may be secured against theft.

DESCRIPTION OF THE DRAWINGS

In the accompanying drawings which form part of the specification and wherein like numerals and letters refer to like parts wherever they occur—

FIG. 3 is a perspective view of a portion of the rack

FIG. 4 is a perspective view of a portion of a rack attached to the cross members under the bed of a trailer; attached to the cab of the truck; and FIG. 5 is a perspective view of a portion of a rack attached to deflector brackets on the cab of the truck.

DETAILED DESCRIPTION

Figure 1:
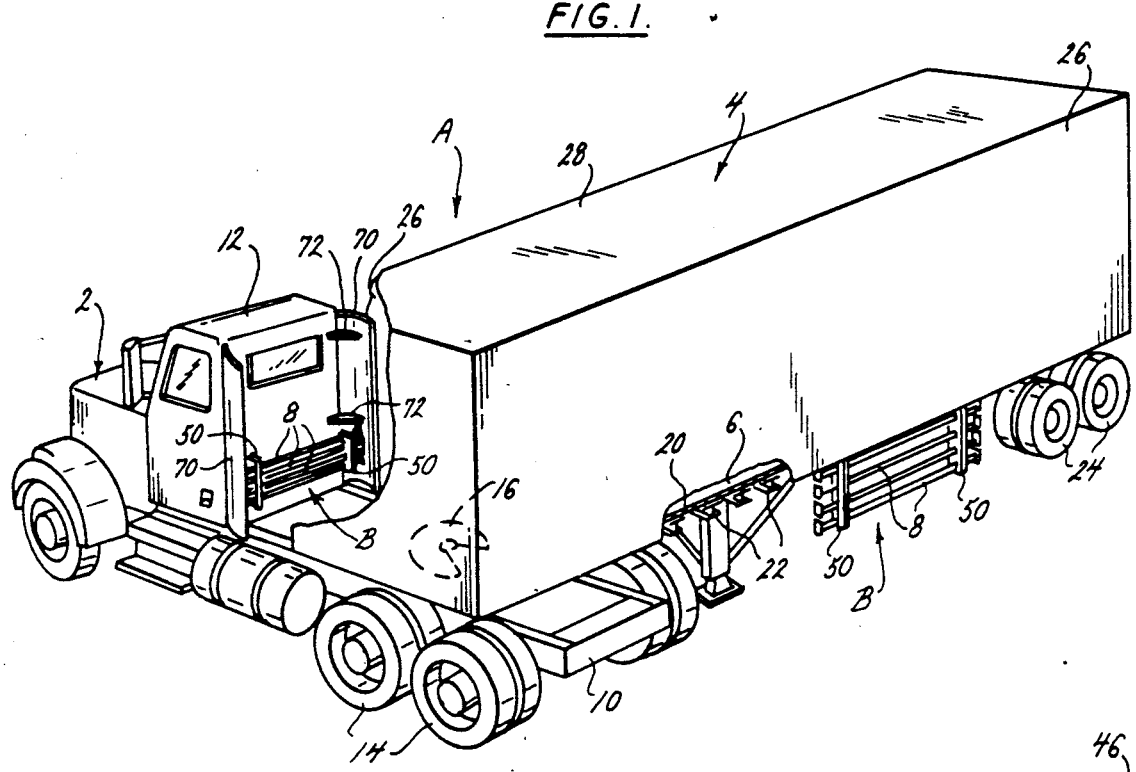
FIG. 1 is a perspective view of a truck provided with the rack of the present invention for holding cargo holders.

Referring now to the drawings, an over-the-road transport vehicle, that is a truck A (FIG. 1), which includes a tractor 2 and trailer 4 having a cargo compartment 6, is provided with racks B for holding cargo holders 8 which are used to stabilize cargo in the cargo compartment 6 of the trailer 4 when the cargo compartment 6 is less than completely filled. In this regard, the tractor 2 and trailer 4 are conventional, except for the presence of the racks B on either one or both of them. The tractor A has a frame 10 and a cab 12 which rests on the frame 10, as well as wheels 14 which support the frame 10 above the road. In addition, the tractor 2 has a so-called fifth wheel assembly 16 attached to its frame 10 in the region of the rear wheels 14. The fifth wheel assembly 16 couples the trailer 4 to the tractor 2. The trailer 4, on the other hand, has a bed 20 which is reinforced with cross members 22 that are actually beams of I-shaped cross-sectional configuration. The forward end of the bed 20 rests on the fifth wheel assembly 16 of the tractor 2, whereas the trailing end is supported on wheels 24. The trailer 4 has side walls 26 and a roof 28 which serve to enclose the cargo compartment 6.

Figure 2:
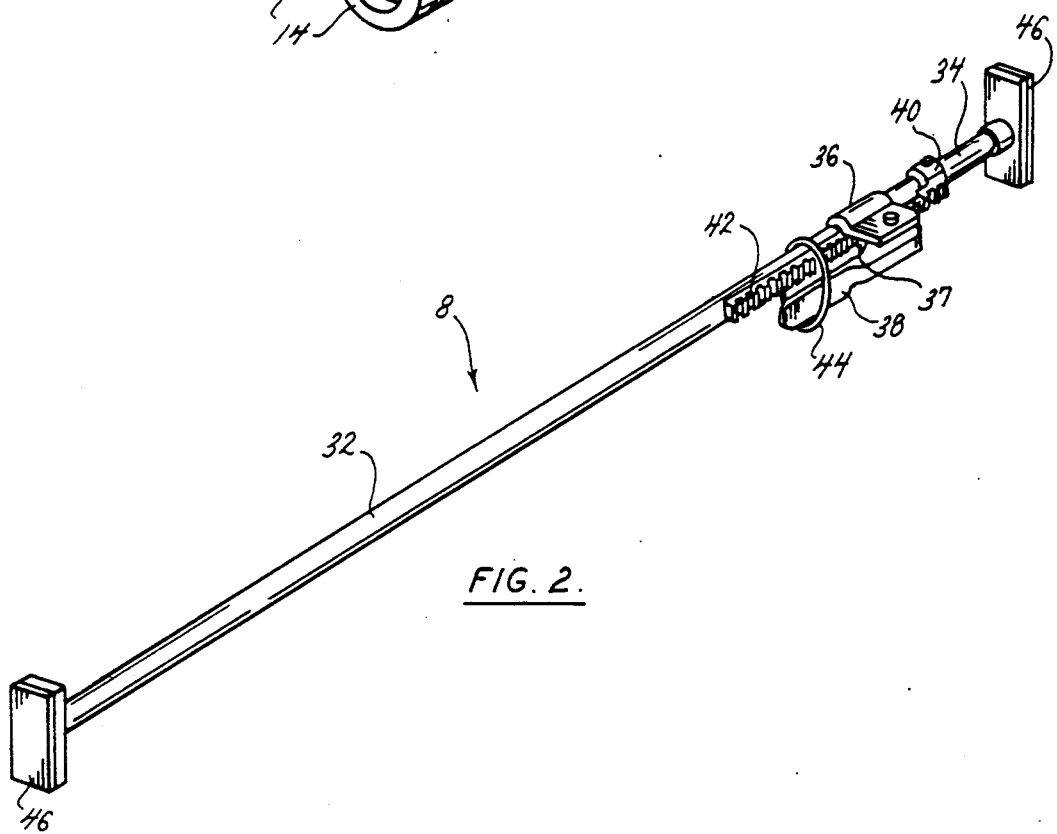
FIG. 2 is a perspective view of one of the cargo holders.

The cargo holders 8, which are likewise conventional, are designed to span the cargo compartment 6 and in effect reduce the size of the compartment 6 so that cargo will remain stationary within it during the jolts and other accelerations experienced as the trailer moves over a highway. Each cargo holder 8 has large and small tubes 32 and 34 (FIG. 2), with the latter receiving the former, so that the tubes 32 and 34 are mounted telescopically with respect to each other. Where the small tube 34 enters the large tube 32, the large tube 32 is fitted with a clevis 36 on which a gear segment 37 rotates. The gear segment 38 in turn merges into a handle 38 which may be rotated to a position in which it lies parallel to the tube 32. That portion of the small tube 34 which projects from the large tube is fitted with a collar 40 which is secured with a bolt such that it can be released from the small tube 34, moved along that tube 34, and repositioned. The collar 40 has a rack 42 connected to it, and the rack 42 extends through the clevis 36 where, depending on the position of the handle 38, it may or may not be engaged by the gear segment 37. Indeed, when the handle 38 is raised, that is when it is generally perpendicular to the tube 32, the gear segment 37 is disengaged from rack 42 and the rack 42 slides easily through the clevis 36, and this of course enables the small tube 34 to be extended from the large tube quite rapidly. However, as the handle 38 is forced downwardly toward the large tube 32, its gear segment 37 engages the rack 42. Continued rotation of the gear segment 37 shifts the rack 42 through the clevis 36 and extends the small tube 34 a short distance further out of the large tube 32, indeed with considerable force. The length of the cargo holder 8 increases. To prevent the small tube 34 from retracting, the large tube 32 carries a ring 44 which may be looped over the handle 38 to hold the handle 38 in its depressed position in which it lies parallel to the tube 32. Other types of cargo holders likewise have telescopically mounted tubes 32 and 34, but utilize a ratchet mechanism to extend and retract them, much the same as an automotive bumper jack. The collar 40 is positioned on the small tube 34 such that when the rack 42 is nearly fully retracted with respect to the clevis 36, the cargo holder 8 will fit between the side walls 26 of the trailer 4. At their far ends, the tubes 32 and 34 are fitted with pads 46 having outwardly presented surfaces formed from a high friction material such as rubber.

To install a cargo holder S against the cargo in a partially filled trailer 4, the operator raises the handle 38 to release the gear segment 37 from the rack 42. He then moves the small tube 34 until it is retracted far enough into the large tube 32 to enable the cargo holder 8 to fit between the side walls 26 of the trailer 4. Then within the cargo compartment 6 of the trailer 4, he raises the cargo holder 8 to the elevation at which he desires to place the cargo holder 8, and while holding it against the cargo, extends the small tube 34 from the large tube 32 until the pads 46 are against the opposite side walls 26 of the trailer 4. He then rotates the handle 38 downwardly, whereupon the gear segment 37 engages the rack 42 and drives the rack 42 through the clevis 36 a short distance. The small tube 34 extends still farther from the large tube 32, and the pads 46 bear snugly against the inside surfaces of the opposite side walls 26, thus lodging the cargo holder 8 snugly between the walls 26 of the trailer 4. The ring 44 is then fitted over the handle 38 to retain it in its depressed position. Of course, to remove the cargo holder 8, the operator reverses the foregoing sequence. The cargo holder 8 may also be installed between the bed 20 and the roof 28.

The rack B for securing the cargo holders 8 on the truck A when they are not in use includes two carrier bars 50 which are mounted on the truck A at spaced apart locations, yet at essentially the same elevation, with each being in a vertical orientation (FIG. 1). The space between the two bars 50 is less than the length of the cargo holders 8 when those holders 8 are nearly fully retracted. The bars 50 are preferably cut from steel plate, about 3/16 inches thick, and are coated with vinyl to protect the steel from corrosion and to prevent the cargo holders 8 from coming directly against the steel. Each bar 50 has several notches 52 which open laterally out of one of its longitudal edges (FIG. 3). Each notch 52, in turn, is wide enough and deep enough to receive the large tube 32 of any one of the cargo holders B and even the clevis 36. Indeed, the cargo holders 8 fit into corresponding notches 52 of the two bars 50 and as such span the space between the bars 50. Directly above its uppermost notch 52 and near the longitudinal edge out of which those notches 52 open, each bar 50 is fitted with a horizontal pivot pin 54 to which a retaining arm 56 is connected. The arm 56, when unrestrained, will swing on the pivot pin 54 between closed and open positions. Normally, the retaining arm 56 assumes its closed position wherein it extends along the notches 52 and partially covers them along the edge out of which the notches 52 open so as to, in effect, close the notches 52. Yet the retaining arm 56 leaves enough of the notches 52 exposed to enable them to accommodate the large bars 32 and cover the clevises 36 and handles 38 of the cargo holders 8. Indeed, each retaining arm 56 has notches 58 which lie centered at the notches 52 of its carrier bar 50 and open toward the closed ends of the carrier bar notches 52. However, the retaining arm notches 52 are somewhat smaller than the carrier bar notches 52, both as to width and length. Actually, the retaining arm notches 58 are only slightly longer than the cross-sectional size of the handle 38 for the cargo holder 8, so that the handle 38, will fit into the retaining arm notch 38 while the clevis 36 or large tube 32 fits into that portion of the carrier bar notch 52 which lies behind the retaining arm 56.

The pivot pin 54 enables the retaining arm 56 to swing outwardly to its open position wherein it exposes the notches 52 so that the cargo holders 8 may be inserted in them. The retaining arm 56 extends downwardly beyond the lowest notch 52 in the carrier bar 50, and below that notch it is provided with an aperture 60 which aligns with another aperture 60 in the bar 50 when the retaining arm 56 is in its closed position. The two apertures 60 receive a locking device 62, such as, the shank of a padlock or simply a retaining pin, for holding the returning arm 56 in its closed position.

The rack B may be positioned along the back of the cab 12 for the tractor 2 (FIG. 1). In this regard, the cab 12 has a metal back wall 64 which extends vertically and transversely across almost the entire width of the tractor 2, and at its sides curves forwardly to merge into the side walls. When a rack B is positioned against the back wall 64, each of its carrier bars 50 is provided along its uninterrupted longitudinal edge with oblique tabs 66 (FIG. 4) which fit flat against the back wall 64 of the cab 12 where it curves forwardly and are indeed fastened to that wall with screws 68. When the rack B is so mounted, the notches 52 of its carrier bars 50 open rearwardly away from the cab 12, and the retaining bars 56 swing in that direction as well.

The cab 12 may be fitted with extenders 70 (FIG. 1) to improve the aerodynamic characteristics of the entire truck A, inasmuch as they flare outwardly from the back wall 64 where it curves forwardly. The extenders 70 are attached with brackets 72 which curve inwardly and are fastened to the flat portion of the back wall 64. When the cab 12 is provided with such extenders, the carrier bars 50 of the rack B have horizontal tabs 74 (FIG. 5) which fit over the extender brackets 72 and are fastened to them with bolts 76.

The rack B may also be positioned along the underside of the bed 20 of the trailer 4 near one of the sides of the trailer A (FIG. 1). In this regard, a considerable amount of free space exists along the underside of the trailer bed 30 between the region where the trailer 4 couples to the fifth wheel assembly 16 and the wheels 24 for the trailer 4. This space easily accommodates the cargo holders 8. In this instance, the carrier bars 50 depend from cross members 22, that are located beneath the floor 20, with their notches opening laterally to the side of the trailer 4. To accommodate the I-shaped cross members 22, each bar 50 has along its upper margin an offset 80 (FIG. 3) and a flange 82 directed upwardly from the offset 80. The offset 80 is slightly wider than the depth of the flanges for the cross members 22, whereas the flange 82 is slightly shorter than the height of the webs for the cross members 22. This enables the flange 82 to fit against the web of one of the cross member 22 to which it is attached with bolts 84, and the bar 50 to projects downwardly from the beam 22. The bar 50 is rigidified by a bracket 86 which extends diagonally from the same beam 22 to the carrier bar 50, connecting to the latter generally midway between its ends and near its uninterrupted edge.

To install the cargo holders 8 in the rack B, irrespective of whether it is mounted on the cab 12 or trailer bed 20, the locking devices 62 securing the lower ends of the retaining bars 56 are removed from the apertures 60 and the retaining arms 56 are raised to their open positions. They pivot about the pins 54 at the upper ends of the bars 50. With the arms 56 raised, the cargo holders 8 are loaded into the notches 52 of the carrier bars 50 such that the clevis 36 of each cargo holder 8 locates at one of the bars 50 with its handle 38 presented outwardly. The large tube 32 of that cargo holder 8 fits into the corresponding notch 52 in the other carrier bar 50.

When all of the cargo holders 8 are loaded, the retaining arms 56 are released. They swing downwardly to their closed positions, wherein their notches 58 align with and receive the handles 38 of the cargo holders 8. The apertures 60 in the arms 56 and carrier bars 50 are brought into alignment, and the locking device 62 is inserted through them, thus securing the arms 56 to the bars 50.

This invention is intended to cover all changes and modifications of the example of the invention herein chosen for purposes of the disclosure which do not constitute departures from the spirit and scope of the invention.

What is claimed is:

1. In combination with a truck having a bed and side walls arranged such that a cargo compartment exists between the side walls and over the bed, and elongated cargo holders which are capable of spanning the cargo compartment so as to confine cargo to a limited area of the bed; a rack mounted on the truck for holding the cargo holders when they are not confining cargo, said rack comprising: spaced apart carrier means for receiving the cargo holders at spaced apart locations on such holders and for retaining them on the truck, each carrier means including an elongated carrier bar arranged generally vertically and having notches which open out of the bar and receive the cargo holders, and retaining means for closing the notches where the notches open out of the bar, the retaining means including a retaining arm which pivots relative to the carrier bar between an open position, wherein the arm is away from the notches in the carrier bar and the open ends of the notches are exposed, and a closed position, wherein the arm extends along the carrier bar and closes the otherwise open ends of the notches, the retaining arm further having notches which align with and open toward the notches in the carrier bar when the retaining arm is closed, the carrier means also including locking means for securing the retaining arm in its closed position.

2. The combination according to claim 1 wherein each cargo holder has first and second members which telescope relative to each other and extending means mounted on the first member generally where the second member extends from the first member for engaging the second member and extending it; and wherein the notches of one of the carrier bars are large enough to receive the extending means of the cargo holders.

3. The combination according to claim 1 wherein each cargo holder has first and second members which telescope with respect to each other and extending means mounted on the first member generally where the second member extends from the first member for engaging the second member and extending it, the extending means including an operating handle which swings toward and away from the first member; and wherein the notches of one of the carrier bars are large enough to receive the extending means of the cargo holders and the notches for the retaining arm for that carrier bar receive the handle for the extending means.

4. In combination with a truck having a bed and side walls arranged such that a cargo compartment exists between the side walls and over the bed, and elongated cargo holders which are capable of spanning the cargo compartment so as to confine cargo to a limited area of the bed; a rack mounted on the truck for holding the cargo holders when they are not confining cargo, said rack comprising: spaced apart carrier means for receiving the cargo holders at spaced apart locations on such holders and for retaining them on the truck, each carrier means including an elongated carrier bar arranged generally vertically and having notches which open out of the bar and receive the cargo holders, and retaining means for closing the notches where the notches open out of the bar, the carrier bars being attached to the truck beneath the bed of the truck near one of the side walls and extending downwardly away from the bed.

5. In combination with a truck including a tractor and a trailer which is connected to the tractor so as to pivot with respect to the tractor, the tractor having a cab provided with a back wall that is presented rearwardly toward the trailer, the trailer having a bed and side walls arranged such that a cargo compartment exists between the side walls and over the bed, and elongated cargo holders which are capable of spanning the cargo compartment of the trailer so as to confine cargo to a limited area of the bed; a rack mounted on the truck for holding the cargo holders when they are not confining cargo, said rack comprising: spaced apart carrier means for receiving the cargo holders at spaced apart locations on such holders and for retaining them on the truck, each carrier means including an elongated carrier bar attached to the back wall of the cab for the tractor and arranged vertically, the carrier bar having notches which open rearwardly out of the bar and receive the cargo holders, and retaining means for closing the notches where the notches open out of the bar.

6. In combination with a truck including a tractor and a trailer which is connected to the tractor so that it will pivot with respect to the tractor, the trailer having a bed and side walls arranged such that a cargo compartment exists between the side walls and over the bed, the trailer further having cross members which reinforce its bed, and elongated cargo holders which are capable of spanning the cargo compartment so as to confine cargo to a limited area of the bed; a rack mounted on the truck for holding the cargo holders when they are not confining cargo, said rack comprising: spaced apart carrier means for receiving the cargo holders at spaced apart locations on such holders and for retaining them on the truck, each carrier means including an elongated carrier bar attached to and extended downwardly from a cross member of the bed, the carrier bar being arranged generally vertically and having notches which open out of the bar laterally with respect to the trailer and receive the cargo holders, and retaining means for closing the notches where the notches open out of the bar.

7. In combination with a truck having a bed and spaced apart side walls arranged to enclose a cargo compartment, the improvement comprising: carrier bars attached to the truck at spaced apart locations, each bar having notches arranged in succession vertically in the bar and opening out of an edge of the bar; cargo holders located within the notches of the bars, with each holder spanning the space between the two bars and being received in a notch of each bar, the cargo holders being extensible to a length great enough to span the cargo compartment between the side walls of the truck so that they may be lodged between the side walls to confine a load over a limited area of the bed; and retaining means mounted on each of the carrier bars for closing the notches so as to retain the cargo holders in the notches, the retaining means for each carrier bar comprising a retaining arm which pivots relative to the bar between open and closed positions, the arm being away from the notches when in its open position and extending over the otherwise open ends of the notches when in its closed position, and locking means for holding the arm in its closed position.

8. The combination according to claim 7 wherein the retaining arms have notches which open toward the notches in their respective carrier bars when the retaining arms are in their closed positions.

9. The combination according to claim 8 wherein the notches in the retaining arms are smaller than the notches in the carrier bars.

10. The combination with a truck having a bed and spaced apart side walls arranged to enclose a cargo compartment, the improvement comprising: carrier bars attached to the bed of the truck at spaced apart locations and extending downwardly from the bed, each bar having notches arranged in succession vertically in the bar and opening out of an edge of the bar; cargo holders located within the notches of the bars, with each holder spanning the space between the two bars and being received in a notch of each bar, the cargo holders being extensible to a length great enough to span the cargo compartment between the side walls of the truck so that they may be lodged between the side walls to confine a load over a limited area of the bed; and retaining means mounted on the bars for closing the notches so as to retain the cargo holders in the notches.

11. The combination according to claim 10 wherein the retaining means for each carrier bar comprises a retaining arm which pivots relative to the bar between open and closed positions, the arm being away from the notches when in its open position and extending over the otherwise open ends of the notches when in its closed position, and locking means for holding the arm in its closed position.

12. In combination with a truck including a tractor and a trailer that is connected to and pulled by the tractor, the tractor having a cab provided with a back wall that is presented rearwardly toward the trailer, the trailer having a bed and spaced apart side walls arranged to enclose a cargo compartment, the improvement comprising: carrier bars attached to the back wall of the cab at spaced apart locations, each bar having notches arranged in succession vertically in the bar and opening rearwardly out of an edge of the bar; cargo holders located within the notches of the bars, with each holder spanning the space between the two bars and being received in a notch of each bar, the cargo holders being extensible to a length great enough to span the cargo compartment between the side walls of the truck so that they may be lodged between the side walls to confine a load over a limited area of the bed; and retaining means mounted on the bars for closing the notches so as to retain the cargo holders in the notches.

13. In combination with a truck including a tractor and a trailer that is connected to and pulled by the tractor, the trailer having a bed and spaced apart side walls arranged to enclose a cargo compartment, the improvement comprising: carrier bars attached to the bed of the trailer at spaced apart locations and extending downwardly, each bar having notches arranged in succession vertically in the bar and opening out of an edge of the bar laterally with respect to the trailer; cargo holders located within the notches of the bars, with each holder spanning the space between the two bars and being received in a notch of each bar, the cargo holders being extensible to a length great enough to span the cargo compartment between the side walls of the truck so that they may be lodged between the side walls to confine a load over a limited area of the bed; and retaining means mounted on the bars for closing the notches so as to retain the cargo holders in the notches.

* * * * *